US008688318B2

(12) United States Patent
Richards et al.

(10) Patent No.: US 8,688,318 B2
(45) Date of Patent: Apr. 1, 2014

(54) DC CONVERTER DIAGNOSTICS FOR VEHICLES

(75) Inventors: Jeffrey S. Richards, Fenton, MI (US); Daniel P. Grenn, Highland, MI (US); Voytek A. Novak, Sterling Heights, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 0 days.

(21) Appl. No.: 13/435,331

(22) Filed: Mar. 30, 2012

(65) Prior Publication Data

US 2013/0261883 A1    Oct. 3, 2013

(51) Int. Cl.
*G06F 7/10*    (2006.01)

(52) U.S. Cl.
USPC .... 701/34.4; 363/13; 123/179.4; 123/406.33; 318/400.3

(58) Field of Classification Search
USPC ........... 701/19, 29.2, 34.4; 320/104; 429/422; 363/13; 123/179.16, 406.33, 179.4; 318/400.3; 345/98
See application file for complete search history.

(56) References Cited

U.S. PATENT DOCUMENTS

| | | | | |
|---|---|---|---|---|
| 4,586,474 | A | * | 5/1986 | Akasu ...................... 123/406.33 |
| 2005/0254265 | A1 | * | 11/2005 | Yamada .......................... 363/13 |
| 2006/0060162 | A1 | * | 3/2006 | Fukui et al. .............. 123/179.16 |
| 2007/0278990 | A1 | * | 12/2007 | Raichle et al. ................ 320/104 |
| 2009/0241883 | A1 | * | 10/2009 | Nagoshi et al. ............ 123/179.4 |
| 2009/0312894 | A1 | * | 12/2009 | Meltser et al. ................... 701/19 |
| 2010/0225258 | A1 | * | 9/2010 | Namuduri et al. ......... 318/400.3 |
| 2011/0086280 | A1 | * | 4/2011 | Roustaei ....................... 429/422 |
| 2011/0166745 | A1 | * | 7/2011 | Tiwari et al. .................... 701/34 |
| 2011/0290216 | A1 | * | 12/2011 | Ma et al. .................. 123/406.76 |

* cited by examiner

*Primary Examiner* — Tuan C. To
*Assistant Examiner* — Yuri Kan
(74) *Attorney, Agent, or Firm* — Ingrassia Fisher & Lorenz, P.C.

(57) ABSTRACT

Methods, program products, hybrid, and non-hybrid vehicles are provided for providing diagnostics for a direct current (DC) converter of the hybrid, and non-hybrid vehicle. The vehicle includes an engine, a rechargeable energy storage system (RESS), the direct current (DC) converter, and a controller. The engine is automatically turned on and off based on driver inputs in accordance with an auto-stop feature. The RESS at least facilitates turning on the engine. The DC converter is coupled to the RESS. The controller is coupled to the DC converter, and is configured to determine a status of the engine, receive a DC converter voltage value from the DC converter, and provide diagnostics for the DC converter based on the engine status, RESS voltage, and the DC converter voltage.

20 Claims, 4 Drawing Sheets

DC CONVERTER DIAGNOSTICS FOR VEHICLES

TECHNICAL FIELD

The present disclosure generally relates to the field of vehicles and, more specifically, to methods and systems for performing diagnostics for a direct current (DC) converter for a vehicle.

BACKGROUND

Vehicles today, hybrid and non-hybrid, include a rechargeable energy storage system (RESS) (such as a low voltage 12 volt, or high voltage 360 volt battery) and an engine (such as an internal combustion engine). During vehicle stops (for example, while at a stop sign or a stop light), the vehicle may automatically turn off the engine and utilize RESS power exclusively, and then automatically turn the engine on again using RESS power when the vehicle resumes movement. This is referred to herein as an auto-stop feature of the vehicle. In order to help stabilize voltage fluctuation when automatically starting the engine, the vehicle may utilize a direct current (DC) converter that boosts and stabilizes the voltage of the RESS during automatic start-up of the engine. Due to the integral involvement of the DC converter in proper vehicle operation, it may be desirable to provide diagnostics for such DC converters.

Accordingly, it is desirable to provide improved methods for providing diagnostics for DC converters for vehicles. It is also desirable to provide improved program products and systems for providing such diagnostics for DC converters utilized in vehicles. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for providing diagnostics for a direct current (DC) converter for a vehicle having an engine that is automatically turned on and off based on driver inputs in accordance with an auto-stop feature is provided. The method comprises determining a status of the engine, receiving a DC converter voltage value from the DC converter, and providing the diagnostics via a processor based on the status of the engine and the DC converter voltage.

In accordance with another exemplary embodiment, a program product for providing diagnostics for a direct current (DC) converter for a vehicle having an engine that is automatically turned on and off based on driver inputs in accordance with an auto-stop feature is provided. The program product comprises a program and a non-transitory computer-readable storage medium. The program is configured to at least facilitate determining a status of the engine, receiving a DC converter voltage value from the DC converter, and providing the diagnostics based on the status of the engine and the DC converter voltage. The non-transitory computer-readable storage medium stores the program.

In accordance with a further exemplary embodiment, a vehicle is provided. The vehicle comprises an engine, a rechargeable energy storage system (RESS), a direct current (DC) converter, and a controller. The engine is automatically turned on and off based on driver inputs in accordance with an auto-stop feature. The RESS at least facilitates turning on the engine. The DC converter is coupled to the RESS. The controller is coupled to the DC converter, and is configured to determine a status of the engine, receive a DC converter voltage value from the DC converter, and provide diagnostics for the DC converter based on the engine and the DC converter voltage.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
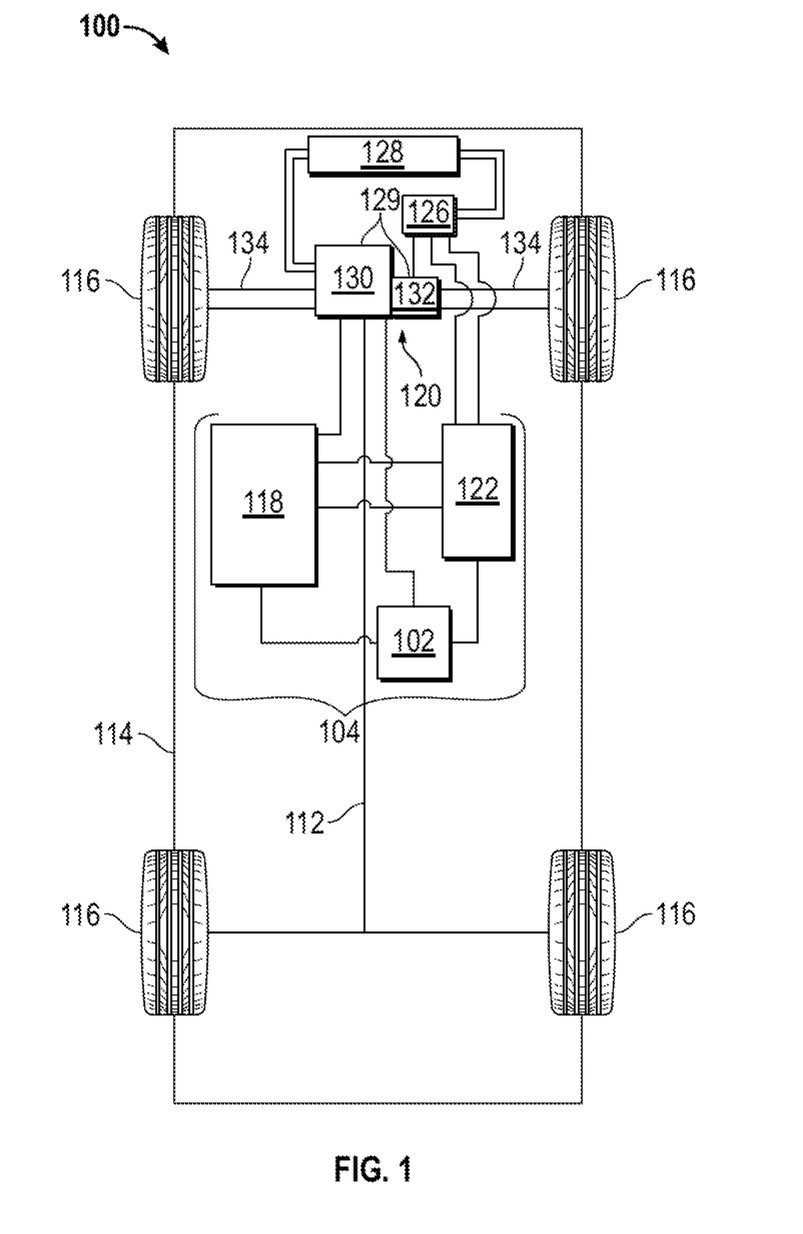
FIG. 1 is a functional block diagram of a vehicle that includes an engine and a control system for controlling the engine, including a rechargeable energy storage system (RESS), a direct current (DC) converter, and an electronic control system, in accordance with an exemplary embodiment.

FIG. 1 illustrates a vehicle 100, or automobile, according to an exemplary embodiment. As described in greater detail further below, the vehicle 100 includes a direct current (DC) converter 102 as well as a control system 104 that provides diagnostics for the DC converter 102.

While described in exemplary embodiments as a vehicle, the vehicle 100 may be any one of a number of different types of automobiles, such as, for example, hybrid or non-hybrid versions of a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 1, the vehicle 100 is a hybrid electric vehicle (HEV), and further includes an actuator assembly 120, a rechargeable energy storage system (RESS) 122, a power inverter assembly (or inverter) 126, and a radiator 128, each disposed within a body 114 of the vehicle 100. The actuator assembly 120 includes at least one propulsion system 129 mounted on the chassis 112 that drives the wheels 116. In the depicted embodiment, the actuator assembly 120 includes an internal combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130.

The RESS 122 is mounted on the chassis 112, and is electrically connected to the inverter 126. The RESS 122 preferably comprises a battery having a pack of battery cells. In one embodiment, the RESS 122 comprises a lithium iron phosphate battery, such as a nanophosphate lithium ion battery. Together the RESS 122 and electric propulsion system(s) 129 provide a drive system to propel the vehicle 100.

In one exemplary embodiment, (illustrated in FIG. 1) the vehicle engine 130 is the only propulsion power source (no electric motor or power inverter module. This embodiment is describing non-hybrid vehicles. In this embodiment the RESS 122 is a lead acid 12 volt battery which supplies the energy necessary to turn the starter motor and start the engine. The RESS also supports the vehicle electrical loads by itself or in conjunction with the vehicle electrical generator subsystem.

The electronic control system (ECS) 118 includes an engine control module (ECM) for the internal combustion engine 130. The ECS 118 is preferably part of the control system 104 that controls the combustion engine 130. Specifically, the ECS 118 controls the combustion engine 130 to be automatically turned off (or stopped) when the vehicle is stopped (for example, at a traffic light), and to be automatically turned on (or re-started) again using power from the RESS 122 when the driver inputs indicate that the vehicle should resume movement. The DC converter 102 boosts the voltage of the RESS 122 as the combustion engine 130 is automatically turned on, so as to maintain a constant voltage during this time, in an amount that is preferably equal to the RESS 122 voltage just prior to the beginning of the automatic starting of the combustion engine 130. Without the DC converter 102, the voltage would drop as the RESS 122 is partially drained in starting the combustion engine 130. The ECS 118 also provides diagnostics for the DC converter 102 and provides appropriate action based on the diagnostics (such as providing appropriate alerts and disallowing the selective turning off of the combustion engine 130 when a fault is diagnosed for the DC converter 102), preferably utilizing the steps of the process 300 described below in connection with FIGS. 3-5. The ECS 118, the DC converter 102, and the RESS 122 are depicted in FIG. 1 as part of the control system 104 referenced above, which will be described in greater detail directly below in connection with FIG. 2.

Figure 2:
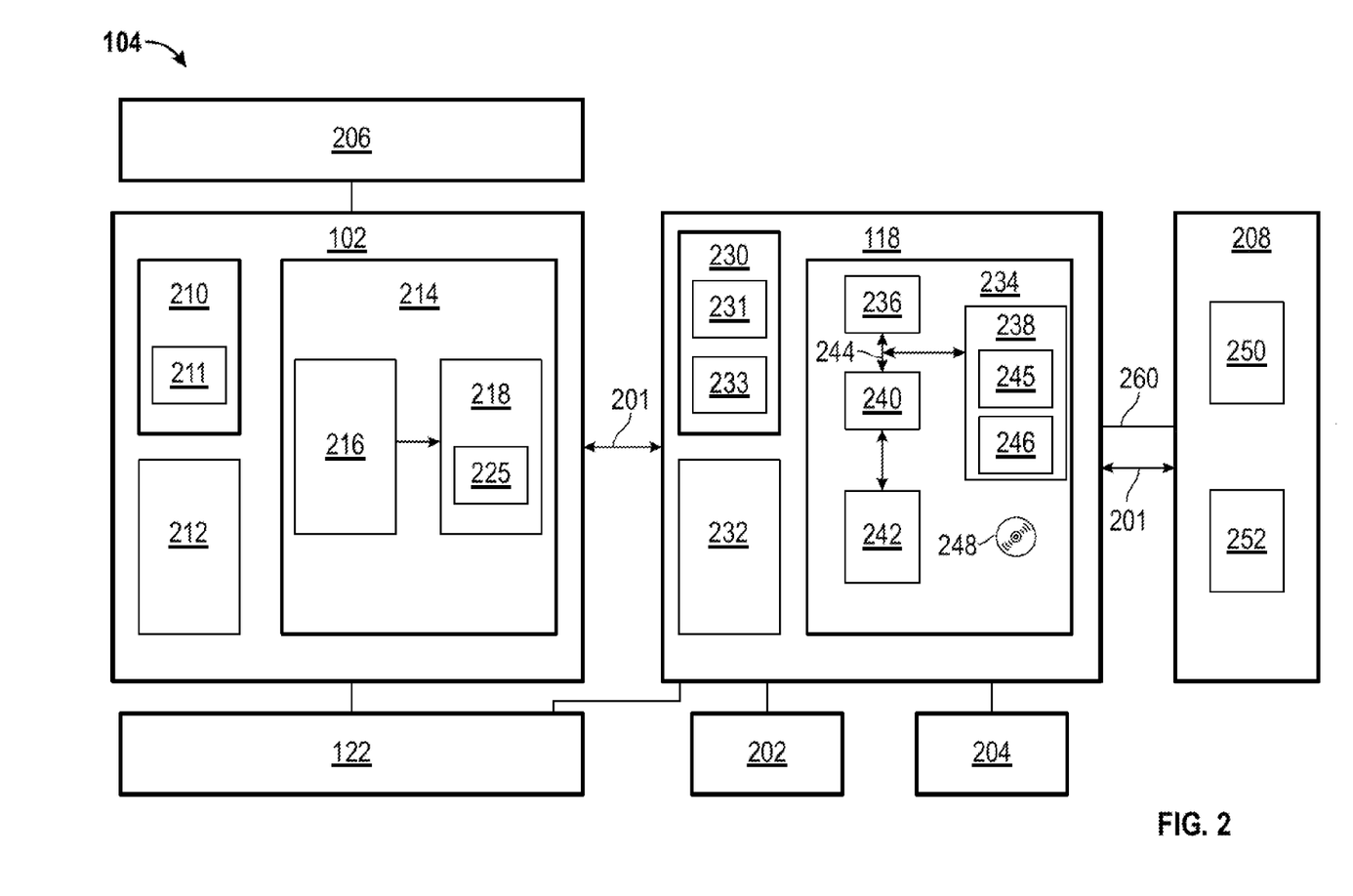
FIG. 2 is a functional block diagram of the control system of FIG. 1, in accordance with an exemplary embodiment.

With reference to FIG. 2, a functional block diagram is provided for the control system 104 of FIG. 1, in accordance with an exemplary embodiment. The control system 104 is coupled to the engine 130 of FIG. 1 (not depicted in FIG. 2). As depicted in FIG. 2, the control system 104 includes the above-referenced RESS 122, ECS 118, and DC converter 102 of FIG. 1, along with a starter relay 202 for the internal combustion engine 130 (see FIG. 1), an ignition switch 204, one or more RESS-sensitive loads 206, and a notification unit 208. The RESS sensitive-loads 206 include vehicle systems with functionality that is sensitive to an operating voltage provided by the RESS 122, such as headlights, dashboard lights, radio, navigation system, and power window(s) for the vehicle to name a few examples.

At the beginning of an ignition cycle for the vehicle, the ignition switch 204 is engaged by a driver of the vehicle. The ECS 118 starts the engine 130 of FIG. 1 via the starter relay 202 using power from the RESS 122. Subsequently, when driver inputs indicate that an auto-stop of the engine is warranted, such as when the vehicle is stopped (for example, as determined when the driver disengages the accelerator pedal or engages the brake pedal of the vehicle for a predetermined amount of time), the engine is automatically turned off pursuant to the auto-stop feature of the vehicle (for example, pursuant to programming of the ECS 118). In certain embodiments, the driver inputs may include a speed approaching zero (or being less than a predetermined threshold), a number of engine revolutions approaching a predetermined threshold representing an idle condition, and/or other parameters indicating or confirming the driver's intent.

The engine is similarly automatically turned back on again, using power from the RESS 122, when the vehicle resumes movement (for example, as determined when the driver disengages the brake pedal or engages the accelerator pedal for a predetermined amount of time). As the engine is automatically started in this manner, the DC converter 102 boosts the voltage from the RESS 122 to provide a constant voltage for the RESS sensitive loads 206 (preferably equal to the voltage of the RESS 122 at a moment in time just before the automatic re-starting of the engine begins).

As depicted in FIG. 2, the DC converter 102 includes a sensor array 210, a transceiver 212, and a control unit 214. The sensor array 210 includes one or more voltage sensors 211 that measure a voltage of the DC converter 102. The transceiver 212 transmits voltage values measured by the voltage sensors 211 to the ECS 118 via a communications bus 201 of the vehicle. The transmitted voltage values preferably include an output voltage of the DC converter 102. The control unit 214 is coupled to the sensor array 210 and the transceiver 212. The control unit 214 directs operation of the DC converter 102, including the measurements of the voltage sensors 211 and the transmission of the values by the transceiver 212.

In the depicted embodiment, the control unit 214 includes a processor 216 and a memory 218. In an exemplary embodiment, the control unit 214 also includes various components similar to the computer system of the ECS 118 described below, including an interface, a bus, and a storage device. The processor 216 performs the computation and control functions of the control unit 214, and may comprise any type of processor or multiple processors, single integrated circuits such as a microprocessor, or any suitable number of integrated circuit devices and/or circuit boards working in cooperation to accomplish the functions of a processing unit. During operation, the processor 216 executes one or more programs 225 contained within the memory 218 and, as such, controls the general operation of the control unit 214 and the computer system of the control unit 214.

The memory 218 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 218 is located on and/or co-located on the same computer chip as the processor 216. In the depicted embodiment, the memory 218 stores the above-referenced program 225.

The ECS 118 is coupled to the DC converter 102 via the communication bus 201. In exemplary embodiments, the ECS 118 provides diagnostics for the DC converter 102. When the ECS 118 determines that there is a fault in the DC converter 102, the ECS 118 disables the auto-stop feature and provides an alert via the notification unit 208 (which may include an audio component to get the attention of the vehicle operator). The ECS 118 is coupled to the notification unit 208 via a communication bus 201 and/or a direct electrical connection 260. The ECS 118 preferably performs these functions in accordance with the steps of the process 300 described further below in connection with FIGS. 3-5.

As depicted in FIG. 2, the ECS 118 includes a sensor array 230, a transceiver 232, and a controller 234. The sensor array 230 includes one or more driver input sensors 231 and one or more voltage sensors 233. The driver inputs sensors 231 measure driver inputs for use in triggering the automatic turning off (stopping) and turning on (starting) of the engine via the auto-stop feature for the engine. In one such example, the driver input sensors 231 include an accelerator pedal sensor and/or a brake pedal sensor. In various embodiments, other sensors may also be used, such as wheel speed sensors, engine sensors, and/or other sensors that may be used to measure parameters used to determine a speed approaching zero (or being less than a predetermined threshold), a number of engine revolutions approaching a predetermined threshold representing an idle condition, and/or other parameters indicating or confirming the driver's intent.

The voltage sensors 233 are coupled to the RESS 122, and measure voltage values of the RESS 122. The transceiver 232 receives information from the DC converter 102 (including the voltage values of the DC converter 102), and also provides signals for the notification unit 208 (which may include an audio component 250 and/or a visual component 252) for providing appropriate alerts for a driver of the vehicle when a determination is made that there is a fault in the DC converter 102.

The controller 234 is coupled to the sensor array 230 and the transceiver 232 and directs operation of the ECS 118, including the sensor array 230 and the transceiver 232. The controller 234 provides diagnostics for the DC converter 102. The controller 234 further provides an alert to the driver of the vehicle via the notification unit 208 and terminates the auto-stop engine feature of the vehicle when the controller 234 determines that a fault is present for the DC converter 102. In a preferred embodiment, the controller 234 performs these functions in accordance with steps of the process 300 described further below in connection with FIGS. 3-5.

As depicted in FIG. 2, the controller 234 comprises a computer system. In certain embodiments, the controller 234 may also include one or more of the sensor array 230, the transceiver 232, the notification unit 208, and/or components thereof In addition, it will be appreciated that the controller 234 may otherwise differ from the embodiment depicted in FIG. 2. For example, the controller 234 may be coupled to or may otherwise utilize one or more remote computer systems and/or other control systems.

In the depicted embodiment, the computer system of the controller 234 includes a processor 236, a memory 238, an interface 240, a storage device 242, and a bus 244. The processor 236 performs the computation and control functions of the controller 234, and may comprise any type of processor or multiple processors, single integrated circuits such as a microprocessor, or any suitable number of integrated circuit devices and/or circuit boards working in cooperation to accomplish the functions of a processing unit. During operation, the processor 236 executes one or more programs 245 contained within the memory 238 and, as such, controls the general operation of the controller 234 and the computer system of the controller 234, preferably in executing the steps of the processes described herein, such as the steps of the process 300 in connection with FIGS. 3-5.

The memory 238 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 238 is located on and/or co-located on the same computer chip as the processor 236. In the depicted embodiment, the memory 238 stores the above-referenced program 245 along with one or more stored values 246 for use in providing diagnostics for the DC converter 102.

The bus 244 serves to transmit programs, data, status and other information or signals between the various components of the computer system of the controller 234. The interface 240 allows communication to the computer system of the controller 234, for example from a system driver and/or another computer system, and can be implemented using any suitable method and apparatus. It can include one or more network interfaces to communicate with other systems or components. The interface 240 may also include one or more network interfaces to communicate with technicians, and/or one or more storage interfaces to connect to storage apparatuses, such as the storage device 242.

The storage device 242 can be any suitable type of storage apparatus, including direct access storage devices such as hard disk drives, flash systems, floppy disk drives and optical disk drives. In one exemplary embodiment, the storage device 242 comprises a program product from which memory 238 can receive a program 245 that executes one or more embodiments of one or more processes of the present disclosure, such as the steps of the process 300 of FIGS. 3-5, described further below. In another exemplary embodiment, the program product may be directly stored in and/or otherwise accessed by the memory 238 and/or a disk (e.g., disk 248), such as that referenced below.

The bus 244 can be any suitable physical or logical means of connecting computer systems and components. This includes, but is not limited to, direct hard-wired connections, fiber optics, infrared and wireless bus technologies. During operation, the program 245 is stored in the memory 238 and executed by the processor 236.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 236) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 234 may also otherwise differ from the embodiment depicted in FIG. 2, for example in that the computer system of the controller 234 may be coupled to or may otherwise utilize one or more remote computer systems and/or other control systems.

Figure 3:
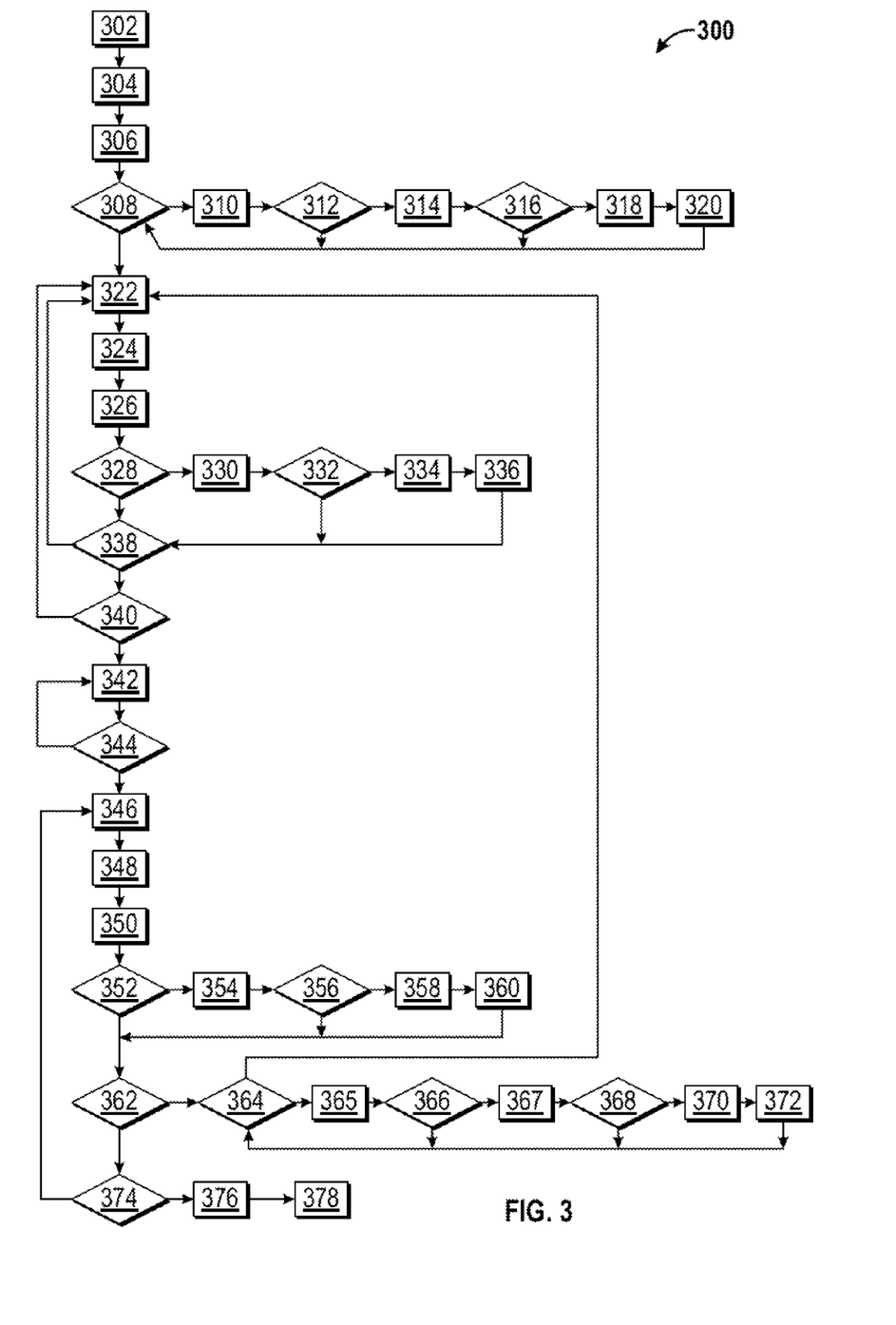
FIG. 3 is a flowchart of a process for providing diagnostics for a DC converter of a vehicle, such as the DC converter of FIGS. 1 and 2, and that can be implemented using the control system of FIGS. 1 and 2 and the vehicle of FIG. 1, in accordance with an exemplary embodiment.

FIG. 3 provides a flowchart of a process 300 for providing diagnostics for a DC converter of a vehicle, in accordance with an exemplary embodiment. The process 300 can be implemented in connection with the vehicle 100 of FIG. 1, the control system 104 of FIGS. 1 and 2, and various components thereof, in accordance with an exemplary embodiment.

The process 300 includes the step of receiving inputs (step 302). During step 302, inputs are obtained regarding the driver's operation of the vehicle, for use in triggering the automatic turning off (stopping) and turning on (starting) the vehicle's engine via the auto-stop feature. In one embodiment, the inputs of step 302 include a driver's engagement of the accelerator pedal and/or brake pedal of the vehicle. In various embodiments, vehicle data may also be used to validate the driver's indications, using sensors such as wheel speed sensors, engine sensors, and/or other sensors that may be used to measure parameters used to determine a speed approaching zero (or being less than a predetermined threshold), a number of engine revolutions approaching a predetermined threshold representing an idle condition, and/or other parameters indicating or confirming the driver's intent. The inputs of step 302 are preferably measured by the driver input sensors 231 of FIG. 2, and signals thereof are sent to the processor 236 of FIG. 2 for processing. The driver inputs of step 302 are preferably obtained repeatedly, most preferably continuously, throughout the process.

Voltage values are obtained for a rechargeable energy storage system (RESS), preferably corresponding to the RESS 122 of FIGS. 1 and 2 (step 304). During step 304, the voltage values preferably represent measures of an output voltage of the RESS. The voltage values are preferably measured by the voltage sensors 233 of the sensor array 230 of the ECS 118 of FIGS. 1 and 2, and signals thereof are sent to the processor 236 of FIG. 2 for processing. The RESS voltage values of step 304 are preferably obtained repeatedly, most preferably continuously, throughout the process.

Voltage values are also obtained for a DC converter, preferably corresponding to the DC converter 102 of FIGS. 1 and 2 (step 306). During step 306, the voltage values preferably represent measures of an output voltage of the DC converter 102. The voltage values are preferably measured by the voltage sensors 211 of the DC converter 102 of FIGS. 1 and 2, and signals thereof are sent to the processor 236 of FIG. 2 for processing. The DC converter voltage values of step 306 are preferably obtained repeatedly, most preferably continuously, throughout the process.

A determination is made as to whether an engine of the vehicle (preferably corresponding to the combustion engine 130 of the vehicle 100 of FIG. 1) is undergoing an initial start for the first time during an ignition cycle (step 308). This determination would occur when the driver engages the ignition switch 204 of FIG. 2 at the beginning of the ignition cycle. This determination is preferably made by the processor 236 of the ECS 118 of FIGS. 1 and 2.

If it is determined that the engine is undergoing an initial start, then a difference is calculated between the RESS voltage of step 304 and the DC converter voltage of step 306 (step 310). The difference is preferably calculated for the various RESS voltage and DC converter voltage values throughout the time period in which the engine is being turned on for the first time during the initial start of the current ignition cycle. The differences are preferably calculated by the processor 236 of FIG. 2.

A determination is made as to whether an absolute value of the difference of step 310 is greater than a predetermined threshold (step 312). In a preferred embodiment, this determination is made for each of the differences counted throughout the time period of step 310. The predetermined threshold is preferably previously stored as one of the stored values 246 of the memory 238 of FIG. 2 and retrieved by the processor 236 of FIG. 2 during this step. In one preferred embodiment, the predetermined threshold is equal to one volt. The determinations of step 312 are preferably made by the processor 236 of FIG. 2.

If it is determined in step 312 that the absolute value of the difference is greater than the predetermined threshold, then an error counter is incremented (step 314). The error counter reflects the number of iterations in which a DC converter error was detected in step 314. The error counted is preferably incremented by the processor 236 of FIG. 2.

Figure 4:
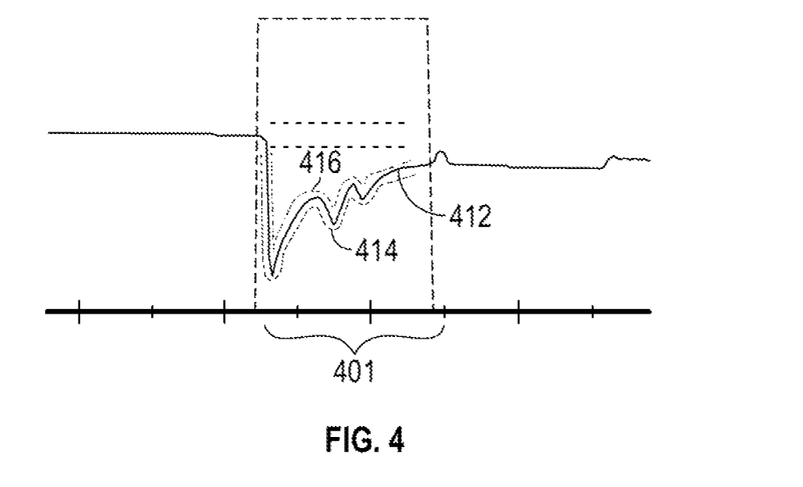
FIGS. 4 and 5 provide graphical representations of implementation of the process of FIG. 3 in providing different types of diagnostics for the DC converter, in accordance with exemplary embodiments.

With reference to FIG. 4, voltage (y-axis) is plotted against time (x-axis) for a region 401 of time for a vehicle (such as the vehicle 100 of FIG. 1). The region 401 represents the initial starting of the engine at the beginning of the ignition cycle (for example, corresponding to the time period of step 310). If the DC converter is functioning correctly during the initial engine start-up (i.e., within region 401 of FIG. 4), the DC converter voltage should be approximately equal to the RESS voltage 412 of FIG. 4, within a margin of error represented between a lower bound 414 and an upper bound 416 for the region 401. This is because the DC converter should act as a voltage pass-through during the initial engine start-up. In one example, the lower bound 414 is approximately one volt less than the RESS voltage 412, and the upper bound 416 is approximately one volt greater than the RESS voltage 412.

A determination is then made as to whether a fault is present with the DC converter (step 316). In one embodiment, a fault is determined to be present if an error has been detected in at least a predetermined percentage of the iterations of step 312. For example, in one embodiment, if an error has been detected in at least X out of Y iterations of step 312 during a current initial engine start-up, then the determination would be made by the processor 236 of FIG. 2 that the DC converter has a fault. In one such embodiment, the DC converter is determined in step 316 to have a fault if the error counter is incremented in at least two out of five iterations of step 314 ("X" being equal to two and "Y" being equal to "5" in the above example). However, this may vary in certain embodiments, as the "X" and "Y" values referenced above may vary for step 316. In one such embodiment, the DC converter may be determined to have a fault if the error counter is incremented during any of the iterations of step 314.

If it is determined in step 316 that a fault is present for the DC converter, then an alert is provided (step 318). The alert of step 318 is preferably provided by the notification unit 208 of FIG. 2 via instructions provided by the processor 236 of FIG. 2. The alert preferably includes an audio notification (such as an audible alarm, a beeping sound, or a verbal description) via the audio component 250 and/or a visual notification (such as an illuminated check engine light or other light, a flashing light, or a visual description) via the visual component 252.

In addition, remedial action is taken if it is determined in step 316 that a fault is present for the DC converter (step 320). The remedial action is preferably carried out via instructions provided by the processor 236. The remedial action preferably includes the setting of an error flag that serves as a termination of the auto-stop feature for the engine of the vehicle, as described further below.

Following step 320, the process returns to step 308 for a determination as to whether the initial engine start-up is still ongoing. This determination is preferably made by the processor 236 of FIG. 2. The process similarly returns to step 308 for this determination if either of the determinations of steps 312 or 316 are determined to be "no" (that, is, if the absolute value of the voltage difference in step 312 is less than or equal to the predetermined threshold of step 312 or if a fault is not determined to be present in step 316). Steps 308-320 repeat in this manner until a determination is made in an iteration of step 308 that the initial engine start-up is complete.

Once the initial engine start-up is complete, the engine is determined to be turned on, in a steady state condition (referred to throughout this application as a "steady state, on" condition) (step 322). As referred to throughout this application, a steady state condition refers to a condition in which the engine is not in the process of being turned on or off, but, rather, has already reached a steady state condition in which the engine is already turned on or off This determination is preferably made by the processor 236 of FIG. 2.

A difference is then calculated between new values of the RESS voltage of step 304 and the DC converter voltage of step 306 that are obtained after the engine is determined to be in the steady state, on condition of step 322 (step 324). The difference is preferably calculated for the various RESS voltage and DC converter voltage values throughout the time period in which the engine remains in the steady state, on condition of step 322. The differences are preferably calculated by the processor 236 of FIG. 2. In addition, the differences are preferably stored in memory (step 326). Specifically, during step 326, the processor 236 of FIG. 2 preferably stores the voltage difference of step 324 in the memory 238 of FIG. 2 as one of the stored values 246 thereof for use in calculating a voltage offset for future ignition cycles in step 376, described further below.

A determination is made as to whether an absolute value of the difference of step 324 is greater than a predetermined threshold (step 328). In a preferred embodiment, this determination is made for each of the differences calculated throughout the time period of step 322. The predetermined threshold is preferably previously stored as one of the stored values 246 of the memory 238 of FIG. 2 and retrieved by the processor 236 of FIG. 2 during this step. In one preferred embodiment, the predetermined threshold is equal to one volt. The determination of step 328 is preferably made by the processor 236 of FIG. 2.

If it is determined in step 328 that the absolute value of the difference is greater than the predetermined threshold, then an error counter is incremented (step 330). The error counter reflects the number of iterations in which a DC converter error was detected in step 328. The error counted is preferably incremented by the processor 236 of FIG. 2.

Figure 5:
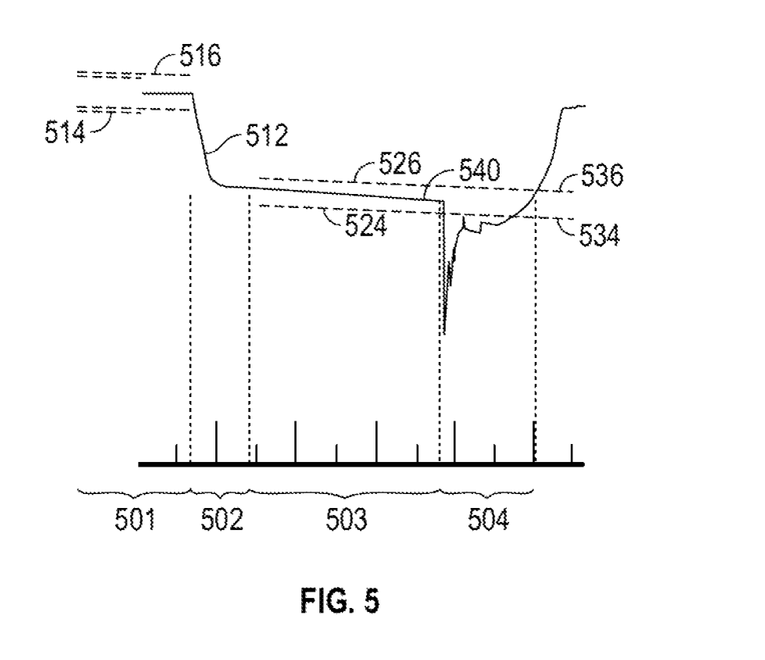

With reference to FIG. 5, voltage (y-axis) is plotted against time (x-axis) for four regions 501, 502, 503, and 504 of time for a vehicle (such as the vehicle 100 of FIG. 1). Each of the regions 501-504 of FIG. 5 is subsequent in time to the region 401 of FIG. 4 (which represented the initial start-up of the engine). Region 501 represents a steady state condition in which the engine is already turned on (as in step 322, described above), region 502 represents a transient condition in which the engine is in the process of being turned off in accordance with an auto-stop feature of the vehicle, region 503 represents a steady-state condition in which the engine is already turned off, and region 504 represents a transient condition in which the engine is in the process of being turned on again in accordance with the auto-stop feature of the vehicle.

With further reference to step 330, if the DC converter is functioning correctly during region 501, the DC converter voltage should be approximately equal to the RESS voltage 512 of FIG. 5, within a margin of error represented between a lower bound 514 and an upper bound 516 during region 501. This is because the DC converter should act as a voltage pass-through during the steady state condition of region 501. In one example, the lower bound 514 is approximately one volt less than the RESS voltage 512, and the upper bound 516 is approximately one volt greater than the RESS voltage 512.

A determination is then made as to whether a fault is present with the DC converter (step 332). In one embodiment, a fault is determined to be present if an error has been detected in at least a predetermined percentage of the iterations of step 328. For example, in one embodiment, if an error has been detected in at least X out of Y iterations of step 328 while the engine is in the steady state, on condition of step 322, then the determination would be made by the processor 236 of FIG. 2 that the DC converter has a fault. In one such embodiment, the DC converter is determined in step 332 to have a fault if the error counter is incremented in at least two out of five iterations of step 330 (with "X" being equal to 2 and "Y" being equal to 5 in the above example). However, this may vary in certain embodiments, as the "X" and "Y" values referenced above may vary for step 332. In one such embodiment, the DC converter may be determined to have a fault if the error counter is incremented during any of the iterations of step 330.

If it is determined in step 332 that a fault is present for the DC converter, then an alert is provided (step 334). The alert of step 334 is preferably provided by the notification unit 208 of FIG. 2 via instructions provided by the processor 236 of FIG. 2. The alert preferably includes an audio notification (such as an audible alarm, a beeping sound, or a verbal description) via the audio component 250 and/or a visual notification (such as an illuminated light, a flashing light, or a visual description) via the visual component 252.

In addition, remedial action is taken if it is determined in step 332 that a fault is present for the DC converter (step 336). The remedial action is preferably carried out via instructions provided by the processor 236. The remedial action preferably includes the setting of an error flag that serves as a termination of the auto-stop feature for the engine of the vehicle, as described further below.

Following step 336, the process proceeds to step 338 for a determination as to whether conditions for an auto-stop for the engine are present. This determination of step 338 is preferably made by the processor 236 of FIG. 2 based on driver inputs of step 302 obtained via the driver input sensors 231 of FIG. 2. For example, in one embodiment, conditions for the auto-stop of the engine may be present when the driver has engaged the brake pedal or disengaged the accelerator pedal of the vehicle for a sufficient amount of time. The process similarly proceeds to step 338 for this determination if either of the determinations of steps 328 or 332 are determined to be "no" (that, is, if the absolute value of the voltage difference in step 328 is less than or equal to the predetermined threshold of step 328 or if a fault is not determined to be present in step 332).

If it is determined in step 338 that conditions are not present for an auto-stop for the engine, then the process returns to step 322, as the engine remains in the steady state, on condition of step 322. Steps 322-338 repeat in this manner until a determination is made in an iteration of step 338 that conditions are present for the auto-stop of the engine.

Once it is determined in an iteration of step 338 that conditions are present for an auto-stop for the engine, then a determination is made as to whether a fault flag has been set (step 340). This determination is preferably made by the processor 236 of FIG. 2. Specifically, a determination is made as to whether the processor 236 of FIG. 2 has set a flag with respect to any of the following: step 316 (described above), step 332 (described above), step 356 (described further below) or step 368 (described further below).

If it is determined in step 340 that any of these flags has been set, the auto-stop feature of the engine has been disabled because a fault has been detected for the DC converter 102 of FIGS. 1 and 2. Accordingly, in one embodiment, the process returns to step 322, and the engine remains in its steady state, on condition of step 322. In another embodiment, the routine and/or process may terminate once a fault is determined Conversely, if it is determined in step 340 that none of the above-referenced flags has been set, the auto-stop feature of the engine has not been disabled (because no errors have been detected for the DC converter 102 of FIGS. 1 and 2). Accordingly, the process proceeds to step 342, described directly below.

During step 342, the engine is in the process of being automatically turned off via the auto-stop functionality of the vehicle. During this time, as the engine is in the process of being turned off (or stopped), the engine is considered to be in a transient condition. Also during this time, determinations are continuously made as to whether the process of turning the engine off is complete (step 344). This determination is preferably made by the processor 236 of FIG. 2. Steps 342 and 344 repeat until a determination is made in an iteration of step 344 that the process of turning off the engine is complete, at which point the process proceeds to step 346, described directly below.

Once the automatic turning off of the engine is complete (as determined in step 344), the engine is determined to be turned off, in a steady state condition (also referred to throughout as a "steady state, off" condition) in step 346. This determination is preferably made by the processor 236 of FIG. 2. A difference is then calculated between new values of the RESS voltage of step 304 and the DC converter voltage of step 306 that are obtained after the engine is determined to be in the steady state, off condition of step 346 (step 348). The differences are preferably calculated for the various RESS voltage and DC converter voltage values throughout the time period in which the engine remains in the steady state, off condition of step 346. The differences are preferably calculated by the processor 236 of FIG. 2. In addition, the differences are preferably stored in memory (step 350). Specifically, during step 350, the processor 236 of FIG. 2 preferably stores the voltage difference of step 348 in the memory 238 of FIG. 2 as one of the stored values 246 thereof for use in calculating a voltage offset for future ignition cycles in step 376, described further below.

A determination is made as to whether an absolute value of the difference of step 348 is greater than a predetermined threshold (step 352). In a preferred embodiment, this determination is made for each of the differences calculated throughout the time period of steps 346-348. The predetermined threshold is preferably previously stored as one of the stored values 246 of the memory 238 of FIG. 2 and retrieved by the processor 236 of FIG. 2 during this step. In one preferred embodiment, the predetermined threshold is equal to one volt. The determination of step 352 is preferably made by the processor 236 of FIG. 2.

If it is determined in step 352 that the absolute value of the difference is greater than the predetermined threshold, then an error counter is incremented (step 354). The error counter reflects the number of iterations in which a DC converter error was detected in step 352. The error counted is preferably incremented by the processor 236 of FIG. 2.

With reference to FIG. 5, if the DC converter is functioning correctly during region 503, the DC converter voltage should be approximately equal to the RESS voltage 512 of FIG. 2, between a margin of error represented between a lower bound 524 and an upper bound 526 during region 503 of FIG. 5. This is because the DC converter 102 should act as a voltage pass-through during the steady state condition of region 503. In one example, the lower bound 524 is approximately one volt less than the RESS voltage 512, and the upper bound 526 is approximately one volt greater than the RESS voltage 512.

A determination is then made as to whether a fault is present with the DC converter (step 356). In one embodiment, a fault is determined to be present if an error has been detected in at least a predetermined percentage of the iterations of step 352. For example, in one embodiment, if an error has been detected in at least X out of Y iterations of step 352 while the engine is in the steady state, off condition of step 342, then the determination would be made by the processor 236 of FIG. 2 that the DC converter has a fault. In one such embodiment, the DC converter is determined in step 356 to have a fault if the error counter is incremented in at least two out of five iterations of step 354 (with "X" being equal to 2 and "Y" being equal to 5 in the above example). However, this may vary in certain embodiments, as the "X" and "Y" values referenced above may vary for step 356. In one such embodiment, the DC converter may be determined to have a fault if the error counter is incremented during any of the iterations of step 354.

If it is determined in step 356 that a fault is present for the DC converter, then an alert is provided (step 358). The alert of step 358 is preferably provided by the notification unit 208 of FIG. 2 via instructions provided by the processor 236 of FIG. 2. The alert preferably includes an audio notification (such as an audible alarm, a beeping sound, or a verbal description) via the audio component 250 and/or a visual notification (such as an illuminated light, a flashing light, or a visual description) via the visual component 252.

In addition, remedial action is taken if it is determined in step 356 that a fault is present for the DC converter (step 360). The remedial action is preferably carried out via instructions provided by the processor 236. The remedial action preferably includes the setting of an error flag that serves as a termination of the auto-stop feature for the engine of the vehicle, as described further below.

Following step 360, the process proceeds to step 362 for a determination as to whether conditions for an auto-start for the engine are present. This determination of step 362 is preferably made by the processor 236 of FIG. 2 based on driver inputs of step 302. For example, in one embodiment, conditions for the auto-start of the engine may be present when the driver has disengaged the brake pedal or engaged the accelerator pedal of the vehicle for a sufficient amount of time. The process similarly proceeds to step 362 for this determination if either of the determinations of steps 352 or 356 are determined to be "no" (that is, if the absolute value of the voltage difference in step 352 is less than or equal to the predetermined threshold of step 352 or if a fault is not determined to be present in step 356).

If it is determined in step 362 that conditions are not present for an auto-start for the engine, then the process returns to step 374, described further below. Conversely, if it is determined in step 362 that conditions are present for an auto-start for the engine, the process proceeds to step 364, described directly below.

During step 364, the engine is automatically turned on (or started). Also during this time, determinations are made as to whether the process of turning the engine on (i.e., starting the engine) is complete. These determinations are preferably made by the processor 236 of FIG. 2. If at any time a determination is made that the automatic starting of the engine is complete, then the process proceeds to step 322, described above. Conversely, so long as the automatic starting of the engine is not complete, the process proceeds to step 365, described directly below.

During step 365, differences are calculated between multiple values of the DC converter voltage of step 306 that are measured and received while the engine is in the process of being automatically turned on. Such differences are preferably calculated continuously throughout the time period in which the engine is being automatically turned on via the automatic functionality of the vehicle (while the functionality is described herein at various times as being "auto-stop" functionality, it will be understood that this functionality also automatically turns the engine back on again as appropriate). During this time, as the engine is in the process of being turned on, the engine is considered to be in a transient condition. In addition, during this time in which the engine is being automatically turned on, the DC converter 102 of FIGS. 1 and 2 boosts the voltage of the RESS 122 of FIGS. 1 and 2, so as to maintain a constant voltage during this time, in an amount that is preferably equal to the RESS voltage just prior to the beginning of the automatic starting of the engine.

A determination is made as to whether any of the differences of step 365 (i.e., as the engine is in the process of being automatically started) are greater than a predetermined threshold (step 366). In a preferred embodiment, this determination is made for each of the differences calculated throughout the time period of step 365. The predetermined threshold is preferably previously stored as one of the stored values 246 of the memory 238 of FIG. 2 and retrieved by the processor 236 of FIG. 2 during this step. In one preferred embodiment, the predetermined threshold is equal to one volt. The determination of step 366 is preferably made by the processor 236 of FIG. 2.

If it is determined in step 366 that the absolute value of the difference is greater than the predetermined threshold, then an error counter is incremented (step 367). The error counter reflects the number of iterations in which a DC converter error was detected in step 366. The error counted is preferably incremented by the processor 236 of FIG. 2.

With reference to FIG. 5, if the DC converter is functioning correctly during region 504, the DC converter voltage should remain constant, regardless of the RESS voltage 512, between a lower bound 534 and an upper bound 536 that represents an acceptable margin of error during region 504. This is because the DC converter should provide a constant level of voltage as the engine is in the process of being started, due to the voltage boost functionality of the DC converter described above. The constant level of voltage should be approximately equal to the RESS voltage 512 at a point in time 540 just before the process began for automatically starting the engine. In one example, the lower bound 534 is approximately one volt less than the RESS voltage 512 at time 540, and the upper bound 536 is approximately one volt greater than the RESS voltage 512 at time 540.

A determination is then made as to whether a fault is present with the DC converter (step 368). In one embodiment, a fault is determined to be present if an error has been detected in at least a predetermined percentage of the iterations of step 366. For example, in one embodiment, if an error has been detected in at least X out of Y iterations of step 366 while the engine is in the transient, starting condition of step 365, then the determination would be made by the processor 236 of FIG. 2 that the DC converter has a fault. In one such embodiment, the DC converter is determined in step 368 to have a fault if the error counter is incremented in at least two out of five iterations of step 367 (with "X" being equal to 2 and "Y" being equal to 5 in the above example). However, this may vary in certain embodiments, as the "X" and "Y" values referenced above may vary for step 368. In one such embodiment, the DC converter may be determined to have a fault if the error counter is incremented during any of the iterations of step 367.

If it is determined in step 368 that a fault is present for the DC converter, then an alert is provided (step 370). The alert of step 370 is preferably provided by the notification unit 208 of FIG. 2 via instructions provided by the processor 236 of FIG. 2. The alert preferably includes an audio notification (such as an audible alarm, a beeping sound, or a verbal description) via the audio component 250 and/or a visual notification (such as an illuminated light, a flashing light, or a visual description) via the visual component 252.

In addition, remedial action is taken if it is determined in step 368 that a fault is present for the DC converter (step 372). The remedial action is preferably carried out via instructions provided by the processor 236. The remedial action preferably includes the setting of an error flag that serves as a termination of the auto-stop feature for the engine of the vehicle, as described further below. Following step 372, the process returns to step 364 for another determination as to whether the auto-start process is complete. Steps 364-372 repeat in this manner until the auto-start process is complete, at which point the process returns to step 322, as described above.

With reference again to the above-described step 362, if it is determined in step 362 that conditions are not present for an auto-start for the engine, then a determination is made as to whether the ignition has been turned off (step 374). In one preferred embodiment, this determination is made by the processor 236 of FIG. 2 as to whether the ignition switch 204 of FIG. 2 has been turned off by a driver of the vehicle. This determination is preferably made continuously throughout the ignition cycle.

If it is determined in step 374 that the ignition is not turned off, then the process returns to step 346, and the engine is determined to be in a steady state, off condition. Steps 346-374 then repeat until a determination is made in a subsequent iteration of step 374 that the ignition is turned off Once it is determined in an iteration of step 374 that the ignition is turned off, then a voltage offset is calculated (step 376). The voltage offset is preferably calculated based on the voltage differences from steps 324-326 and 348-350 (i.e., when the engine is in a steady state condition). The voltage offset is preferably implemented in a subsequent ignition cycle. In certain embodiments, the voltage offset is calculated using average values of the voltage differences from steps 324-326 and 348-350 across multiple ignition cycles. In addition, in certain embodiments, the voltage offset may be calculated and/or updated in step 376 for application during a current ignition cycle, without waiting for a subsequent ignition cycle (for example, if the voltage offset is calculated earlier in the ignition cycle before the ignition is turned off).

In one embodiment, the voltage offset of step 376 reflects an average, or expected difference between the RESS voltage of step 304 and the DC converter voltage of step 306, which may be due, for example, to differing sensor errors or adjustments for the respective voltage sensors 211, 233 of the DC converter 102 and the ECS 118 of FIGS. 1 and 2. For example, in one such embodiment, if the DC voltage is consistently one half of one volt greater than the RESS voltage, then an adjustment factor of one half of one volt may be incorporated into the difference calculations of steps 310, 324, 348, and 365 or the respective determinations of steps 312, 328, 352, and 366, respectively.

With reference to FIGS. 4 and 5, the voltage offset may be implemented in connection with adjustment of the lower bounds 414, 514, 524, 534 and/or upper bounds 416, 516, 526, 536. For example, in one embodiment, if the DC voltage is consistently one half of one volt greater than the RESS voltage, then each of the lower bounds 414, 514, 524, 534 and upper bounds 416, 516, 526, and 536 may be moved downward by one half of one volt. In addition, in certain embodiments, with the added precision and confidence gained by the comparisons and use of the offsets in step 376, the margin of error, or gap between the respective bounds 414-416, 514-516, 524-526, and 534-536 may be decreased (for example, such that the distance between each of the lower bounds 414, 514, 524, 534 and its respective upper bound 416, 516, 526, 536 is less than two volts).

The voltage offset of step 376 is preferably calculated by the processor 236 of FIG. 2. It will be appreciated that, in certain embodiments and/or in certain implementations (for example, in which the voltage differences from steps 324-326 and 348-350 are very close to zero), a voltage offset may not be utilized. Following the calculation of the voltage offset, the voltage offset is stored in the memory 238 of FIG. 2 for implementation (step 378), preferably in a subsequent ignition cycle, and the process then preferably terminates for the current ignition cycle. However, as noted above, in certain embodiments the voltage offset may be calculated earlier in the process and utilized within the same ignition cycle.

Accordingly, improved methods, program products, systems, and vehicles are provided for providing diagnostics for DC converters for vehicles. The improved methods, program products, systems, and vehicles provide testing for DC converter faults based on the condition of the engine (for example, as to whether the engine is in a steady state on condition, a steady state off condition, or in the process of being turned on) along with voltage values of the RESS and/or the DC converter. An appropriate warning is provided, and the auto-stop functionality of the engine is terminated, if it is determined that an error is present for the DC converter.

It will be appreciated that the disclosed methods, systems, and vehicles may vary from those depicted in the Figures and described herein. For example, the vehicle 100, DC converter 102, control system 104, RESS 122, combustion engine 130, and/or various components thereof may vary from that depicted in FIGS. 1 and 2 and described in connection therewith. In addition, it will be appreciated that certain steps of the process 300 (and/or implementations of FIGS. 4 and 5) may vary from those depicted in the Figures and/or described above in connection therewith. It will similarly be appreciated that certain steps of the process described above (and/or sub-processes or sub-steps thereof) may occur simultaneously or in a different order than that depicted in the Figures and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

We claim:

1. A method for controlling an engine of a vehicle having a direct current (DC) converter, wherein the engine is automatically turned on and off based on driver inputs in accordance with an auto-stop feature, the method comprising:
   determining a status of the engine;
   receiving a DC converter voltage from the DC converter; and
   selectively disabling the auto-stop feature of the engine via a processor based on the status of the engine and the DC converter voltage.

2. The method of claim 1, wherein the vehicle further comprises a rechargeable energy storage system (RESS), and the method further comprises:
   measuring an RESS voltage, wherein the step of selectively disabling the auto-stop feature comprises disabling the auto-stop feature based on a comparison of the DC converter voltage with the RESS voltage while the engine is in a steady state condition.

3. The method of claim 2, further comprising wherein the step of selectively disabling the auto-stop feature comprises:
   disabling the auto-stop feature if an absolute value of a difference between the DC converter voltage and the RESS voltage is greater than a predetermined threshold based on the comparison.

4. The method of claim 3, further comprising the step of:
   repeating the comparison for a plurality of ignition cycles, thereby generating a plurality of prior comparisons; and
   adjusting the predetermined threshold for a future ignition cycle based on the plurality of prior comparisons.

5. The method of claim 1, wherein:
   the step of receiving the DC converter voltage comprises receiving a plurality of DC converter voltage values over a time period while the engine is being started and the DC converter provides a voltage boost during an automatic engine start-up following an automatic engine stop; and
   the step of selectively disabling the auto-stop feature comprises disabling the auto-stop feature based on a difference between the DC converter voltage values during the time period.

6. The method of claim 5, wherein the step of selectively disabling the auto-stop feature comprises:
   disabling the auto-stop feature if an absolute value of the difference between the DC converter voltage values is greater than a predetermined threshold.

7. The method of claim 1, wherein the vehicle further comprises a rechargeable energy storage system (RESS), and the method further comprises:
   measuring an RESS voltage, wherein the step of selectively disabling the auto-stop feature comprises disabling the auto-stop feature based on a comparison of the DC converter voltage with the RESS voltage while the engine is being started for a first time during a current ignition cycle for the vehicle.

8. The method of claim 7, wherein the step of selectively disabling the auto-stop feature comprises:

disabling the auto-stop feature if an absolute value of a difference between the DC converter voltage and the RESS voltage is greater than a predetermined threshold based on the comparison.

9. A program product for controlling an engine of a vehicle having a direct current (DC) converter, wherein the engine is automatically turned on and off based on driver inputs in accordance with an auto-stop feature, the program product comprising:
- a program configured to at least facilitate:
  - determining a status of the engine;
  - receiving a DC converter voltage from the DC converter; and
  - selectively disabling the auto-stop feature of the engine based on the status of the engine and the DC converter voltage; and
- a non-transitory computer-readable storage medium storing the program.

10. The program product of claim 9, wherein the vehicle further comprises a rechargeable energy storage system (RESS), and the program is further configured to at least facilitate:
- measuring an RESS voltage;
- generating a comparison of the DC converter voltage with the RESS voltage while the engine is in a steady state condition; and
- disabling the auto-stop feature if an absolute value of a difference between the DC converter voltage and the RESS voltage is greater than a predetermined threshold based on the comparison.

11. The program product of claim 9, wherein the program is further configured to at least facilitate:
- receiving a plurality of DC converter voltage values over a time period while the engine is being started during an automatic engine start-up following an automatic engine stop;
- determining a difference between the DC converter voltage values during the time period; and
- disabling the auto-stop feature if an absolute value of the difference between the DC converter voltage values is greater than a predetermined threshold.

12. The program product of claim 9, wherein the vehicle further comprises a rechargeable energy storage system (RESS), and the program is further configured to at least facilitate:
- measuring an RESS voltage;
- generating a comparison of the DC converter voltage with the RESS voltage while the engine is being started for a first time during a current ignition cycle for the vehicle; and
- disabling the auto-stop feature if an absolute value of a difference between the DC converter voltage and the RESS voltage is greater than a predetermined threshold based on the comparison.

13. A vehicle comprising:
- an engine that is automatically turned on and off based on driver inputs in accordance with an auto-stop feature;
- a rechargeable energy storage system (RESS) that at least facilitates turning on the engine;
- a direct current (DC) converter coupled to the RESS; and
- a controller coupled to the DC converter and configured to:
  - determine a status of the engine;
  - receive a DC converter voltage from the DC converter; and
  - selectively disable the auto-stop feature of the engine based on the engine and the DC converter voltage.

14. The vehicle of claim 13, wherein the controller is further configured to:
- measure an RESS voltage; and
- selectively disable the auto-stop feature of the engine based on a comparison of the DC converter voltage with the RESS voltage while the engine is in a steady state condition.

15. The vehicle of claim 14, wherein the controller is further configured to disable the auto-stop feature if an absolute value of a difference between the DC converter voltage and the RESS voltage is greater than a predetermined threshold based on the comparison.

16. The vehicle of claim 15, wherein the controller is further configured to:
- repeat the comparison for a plurality of ignition cycles, generating a plurality of prior comparisons; and
- adjust the predetermined threshold for a future ignition cycle based on the plurality of prior comparisons.

17. The vehicle of claim 13, wherein the controller is further configured to:
- receive a plurality of DC converter voltage values over a time period while the engine is being started during an automatic engine start-up following an automatic engine stop; and
- selectively disable the auto-stop feature of the engine based on a difference between the DC converter voltage values during the time period.

18. The vehicle of claim 17, wherein the controller is further configured to disable the auto-stop feature if an absolute value of the difference between the DC converter voltage values is greater than a predetermined threshold.

19. The vehicle of claim 13, wherein the controller is further configured to:
- measure an RESS voltage; and
- selectively disable the auto-stop feature of the engine based on a comparison of the DC converter voltage with the RESS voltage while the engine is being started for a first time during a current ignition cycle for the vehicle.

20. The vehicle of claim 19, wherein the controller is further configured to disable the auto-stop feature if an absolute value of a difference between the DC converter voltage and the RESS voltage is greater than a predetermined threshold based on the comparison.

* * * * *